United States Patent [19]

Merz

[11] Patent Number: 4,676,333

[45] Date of Patent: Jun. 30, 1987

[54] SERVO STEERING FOR VEHICLES

[75] Inventor: Johann Merz, Schwabisch Gmund, Fed. Rep. of Germany

[73] Assignee: Zahnradfabrik Friedrichshafen, AG., Friedrichshafen, Fed. Rep. of Germany

[21] Appl. No.: 826,580

[22] Filed: Feb. 6, 1986

[30] Foreign Application Priority Data

Feb. 7, 1985 [WO] PCT Int'l Appl. .................. PCT/EP85/00040

[51] Int. Cl.⁴ ............................................... B62D 5/06
[52] U.S. Cl. ..................................... 180/132; 60/545; 417/418
[58] Field of Search ....................... 180/132, 142, 148; 417/418; 60/545, 571; 280/773

[56] References Cited

U.S. PATENT DOCUMENTS

| | | | |
|---|---|---|---|
| 2,539,018 | 1/1951 | Hardy | 60/571 |
| 3,162,134 | 12/1964 | Lovell | 417/418 X |
| 3,422,765 | 1/1969 | Schoch | 417/418 |
| 3,437,044 | 8/1969 | Sanders et al. | 417/418 |
| 4,580,651 | 4/1986 | Adams | 180/142 |

Primary Examiner—John A. Pekar
Attorney, Agent, or Firm—Zalkind & Shuster

[57] ABSTRACT

A pump is constructed using a magnetic piston in a cylinder having an oil feed thereto, for pumping oil to either pressure chamber of a steering servomotor. The pump cylinder has a chamber on each side of the pump piston which chambers discharge pressure oil into a respective servomotor chamber. The magnetic piston is actuated by an electromagnetic system under control of a manually operated steering wheel. The pump construction is such that the length of traverse of the pump piston on a pressure movement is shorter than the piston traverse of a servomotor chamber being pressurized. The pump chambers discharge directly into respective servomotor chambers without the need for steering control valving.

18 Claims, 1 Drawing Figure

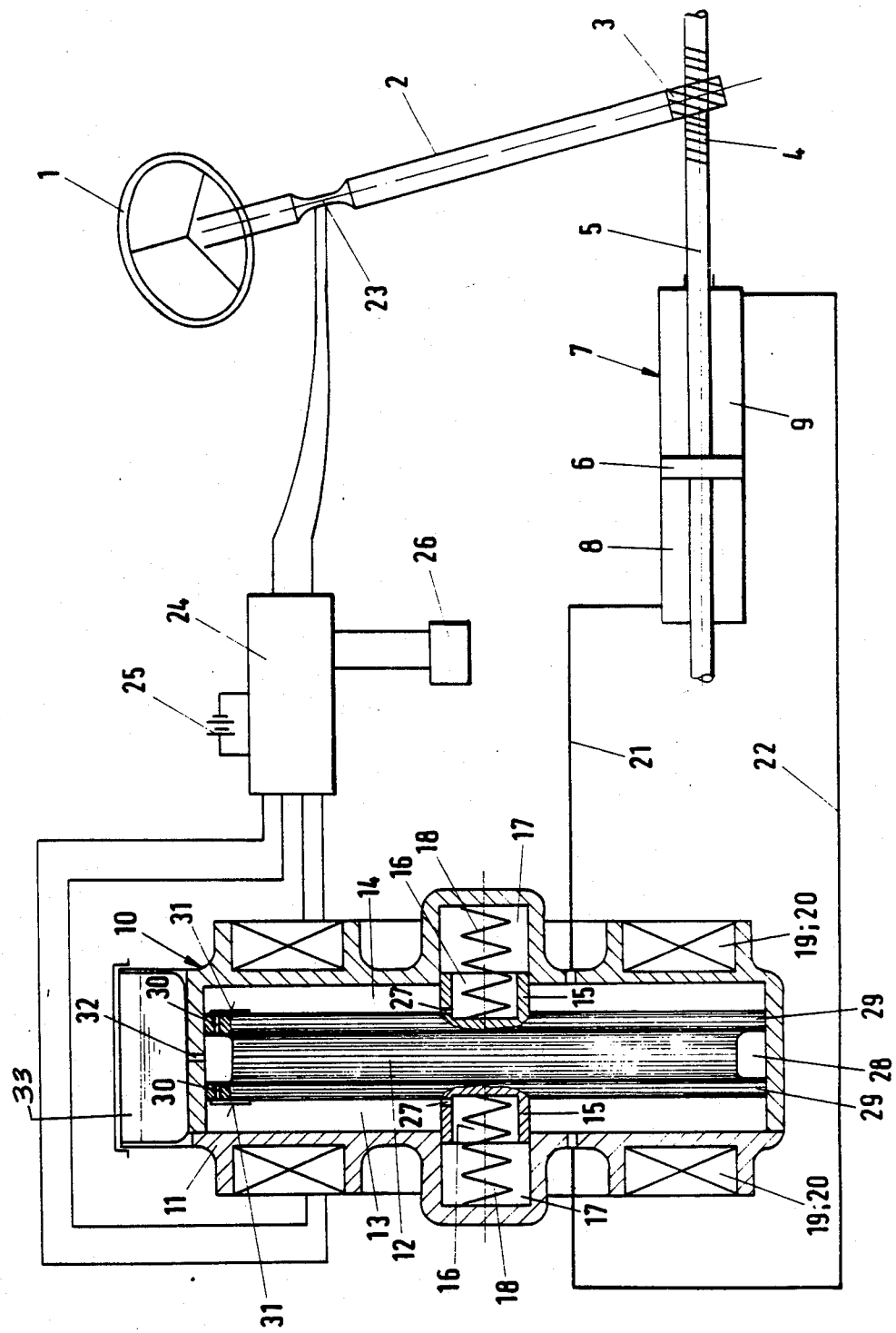

SERVO STEERING FOR VEHICLES

BACKGROUND OF THE INVENTION

The invention relates to booster steering for vehicles having a manual steering wheel, a steering mechanism and a servomotor for booster steering movement of the steering mechanism, wherein a pump pressurizes the servomotor.

In prior art systems complex and expensive steering control valving is customarily used for directing oil pressure flow to one side or the other of a double acting servomotor, responsive to rotation of a manually operated steering wheel. Such systems are further complicated by the need for an engine driven servopump to provide the pressure oil feed to the servomotor.

BRIEF DESCRIPTION OF THE INVENTION

The present invention utilizes an electromagnetic pump comprising a reciprocal piston actuated by solenoids axially spaced from respective sides of the piston. The piston is in a pump cylinder having a pump chamber on each side of the cylinder which chambers connect directly to respective pressure chambers of a servomotor without the intermediary of valving. The diameter of the pump piston is large compared to the traverse in either direction; the dimensioning being such that a short stroke can fill a pressure chamber of the associated servomotor. This reduces the weakening of magnetic flux from a solenoid at a fixed distance from a central position of the piston prior to energization. It will be apparent that the pump piston is of a magnetic material.

Utilizing an electromagnetic pump as shown in the invention results in a booster system simple in its structure with few parts subject to breakdown. The pump is relatively low cost and well suited for mass production.

Construction permits a disclike pump piston for weight reduction having means for guidance and centering in the pump cylinder. The electromagnetic pump may be of any given type of construction but for simplicity a flat piston with a pump pressure chamber on each side is of advantage in my novel construction.

It will be understood that the solenoid energization must provide shifting of the pump piston with sufficient oil pressure to operate the servomotor for booster steering. Further, the pump cylinder should be nonmagnetic or nonmagnetizable material at least in the region of operation of the solenoids.

Regarding the dimensioning of the pump, assuming a cylinder, the diameter of the cylinder is larger than the stroke of the disclike piston in order to effect as short a stroke as design permits so that the solenoids can be located close to the respective piston faces in order to aid the magnetic force of the solenoids. Thus, a large volume of pressure oil can be moved with a large area piston having a short stroke, to readily fill the chambers of a long stroke servomotor.

Various known types of steering control systems could be utilized, e.g., a relatively simple and inexpensive electronic control of the pump can be effected by the regulating equipment shown in German Pat. No. DE 32 36 080 of Apr. 21, 1983, for effecting direction and rate of steering.

Such control is operated by manual rotation of the steering wheel wherein resistors measure torsion exerted as a result of steering wheel rotation. Such steering wheel rotation acting through a steering spindle effects operation of resistance strain gauges of a bridge circuit to control solenoid energization via regulating equipment, as will be understood by persons skilled in the art.

In general, booster effect must be sufficiently present to operate the servomotor when a vehicle is parked and also at low speeds. However, at higher speeds, as a matter of safety the booster effect should be reduced. For that purpose, although complex proposals are known in the prior art, for economy of the present invention an electronic speed responsive component may be incorporated in the regulating equipment in order to reduce booster force to safe low limits at higher speeds.

As a further advantage, and within the skill of electrical engineers, an arrangement of control can be established wherein a magnetic piston can be attracted at one side and repelled at the other in accordance with long known fundamental laws of magnetism.

An embodiment of the invention is shown in the accompanying drawing for which a detailed description now follows as to the essential components, some of which are well known and shown diagramatically, save to say that the invention is usable for virtually all types of known steering mechanisms.

A steering wheel 1 with a steering spindle 2 is illustrated having at its lower end a pinion 3. The pinion 3 meshes with a rack 4 connected to piston rod 5 of a pressure piston 6 in the cylinder of a servomotor 7. The servomotor has two pressure chambers 8 and 9.

An electromagnetic pump 10 with a pump housing 11 has therein a double acting piston 12. The pump 10 is essentially a short cylinder and the piston 12 is in the form of a disc. The piston 12 separates two piston chambers 13 and 14. For guiding of the piston 12, on the longitudinal piston axis on each side of the piston there is a respective cup-like guide 15 slidable within respective circular housings formed in pump housing 11. Thus, guides 15 are carried in recesses 17 of the pump housing 11, the shape and size of which conform to the outside diameter of the guides. In each recess a pump piston centering spring 18 is disposed, one end of which engages the bottom of a recess 17, i.e., the pump housing 11; the other end abuts the interior 16 of a guide 15. The springs acting against the pump piston to center it. Also, the guides prevent tilting of the disc-like pump piston. The springs may also be disposed elsewhere, provided that they center the piston 12 in the housing.

Pump housing 11, consisting of non-magnetic material, has a solenoid 19 of doughnut or disc-like configuration on each side of the pump piston, as shown, and it will be noted the dimensioning is such as to provide as short distance as possible for magnetic flux from the solenoid to the pump piston of magnetic material. This distance must, of course, be such that a sufficient volume of oil on either side of the pump piston can be discharged to fill the respective chambers 7 and 8 of the servomotor 9 for a full stroke of piston 6. Thus by suitable design weakening of the flux strength is avoided as much as possible. Each solenoid 19 has a magnetic coil 20. Further, the doughnut shape of the coils 20 is such as to essentially fill by way of magnetic flux either piston chamber 13 or 14, since the planes of the magnetic coils are parallel to the respective piston faces. The arrangement is such that equal magnetic force occurs, uniform for each side of the pump piston, during energization.

Piston chambers 13 and 14 communicate by connecting lines 21 and 22 with the pressure chambers 8 and 9 of the cylinder of servomotor 7. Accordingly, upon a stroke of pump piston 12, for example, toward the right, oil in chamber 14 is forced during the reduction in volume of that chamber through line 21 into the servomotor pressure chamber 8 which actuates servomotor piston 6. Accordingly, the respective rod 5 is actuated toward the right, effecting a booster force added to the manual force exerted by the steering wheel 1.

Magnetism and direction of the booster force is controlled by the regulating equipment 23 all as generally disclosed in the prior art by way of German Pat. No. 32 36 080, as noted.

Thus the strain gauges associated with the steering spindle sends electric signals to the regulating equipment 24. Contraction and expansion of strain gauges on steering spindle 2 measure the torsion forces which control the signals that are evaluated in the regulating equipment for the purpose of dimensioning the degree of energization of the solenoids for a designed stroke of pump piston 12. There is, of course, control by regulating equipment 24 of a current supply, for example, a vehicle battery for purpose of energizing the solenoids.

Additionally, regulation responsive to speed by means of further regulating equipment 26 may be provided by being incorporated into the regulating equipment 24.

It will be recognized that within the routine skill of electronic engineers a repulsion and attraction effect on the pump piston can be achieved simultaneously, e.g., by magnetic bias, i.e., polarization of the pump piston.

Through the guides 15, bores 27 are drilled connecting respective pump piston chambers 13 and 14 with respective recesses 17 for equalizing pressure therein.

The pump piston 12, although a disc, is provided with an oil leakage as well as an oil temperature compensating chamber 28 at the periphery between spaced ridges 29 slidably sealing in the customary manner the pump piston from the two piston chambers 13 and 14, wherein the ridges effect the compensating chamber 28.

The compensating chamber is connected with an oil tank 33 by means of at least one feed bore 32.

Bores 30 connect compensation chamber 28 with the two piston chambers 13 and 14, wherein nonreturn valves 31 operable toward the pump piston chambers 13 and 14 can feed oil from the tank to those chambers to compensate for oil leakage and temperature changes of oil in the pump piston chambers.

What is claimed is:

1. In a power steering system of the kind having a double acting servomotor (7) with pressure chambers (8, 9) for receiving pressure oil from a pump (10) for power steering by actuation of a servomotor piston (6);
   the improvement wherein said pump has solenoid means (19) for respective steering direction and pump piston means (12) actuated by said solenoid means upon selective electric energization thereof, to selectively pressurize said servomotor pressure chambers;
   said pump piston means having pump chamber means (13, 14) for connection to respective servomotor pressure chambers;
   said pump piston means having a piston face means sufficiently large so as to effect volume discharge for required steering volumes of pressure oil needed in said servomotor pressure chambers, wherein traverse of said pump piston means is shorter than the steering traverse of said servomotor piston;
   including a steering wheel (1) and electric current control means (23, 24) for said solenoid means operable by said steering wheel in response to steering stress on said steering wheel for steering control.

2. In a power steering system as set forth in claim 1, wherein said pump piston means is movable in opposite directions for pressurization of respective servomotor pressure chambers, said pump piston means having respective chamber means on opposite sides.

3. In a power steering system as set forth in claim 2, wherein said pump piston means is directionally actuated with respect to said pump chamber means by selective control means for energization of said solenoid means.

4. In a power steering system as set forth in claim 3, wherein said solenoid means are disposed on opposite sides of said piston means and said piston means being magnetically biased, whereby energization of said solenoid means effects a simultaneous force of attraction and repulsion on said piston means.

5. In a power steering system as set forth in claim 4, said piston means being disc-like in shape, wherein the diameter of the piston means is larger than the traverse thereof.

6. In a power steering system as set forth in claim 5, wherein said piston means has a piston (12) comprised of magnetic material, a housing (11) of non-magnetic material in which said piston reciprocates and said piston having guide means (15) coaxial therewith and slidable in said housing to prevent tilting of said piston.

7. In a power steering system as set forth in claim 6, said housing having chambers (17) on opposite sides of said piston in which said guide means are slidable.

8. In a power steering system as set forth in claim 7, said guide means comprising cups and said chambers comprising respective spring chambers into which said cups are slidable; piston centering springs disposed in respective spring chambers for centering said piston in said housing.

9. In a power steering system as set forth in claim 8, including passages from said spring chambers to respective sides of said piston within respective pump pressure chambers to permit ingress and egress of pressure oil into said spring chambers with movement of said piston.

10. In a power steering system as set forth in claim 9, said piston having spaced peripheral sealing rings slidably and sealingly engaged within said housing, whereby a groove (28) for receiving pressure oil intermediate said peripheral sealing rings (29) is effected;
    said housing having a tank (33) for pressure oil and a passage (32) from said tank leading into said groove;
    a passage (30) through each sealing ring from said groove to a respective pump pressure chamber;
    including a check valve (31) for each of said latter passages to permit oil from said tank to enter respective pump pressure chambers from said groove depending upon the direction of traverse of said piston.

11. In a power steering system as set forth in claim 10, wherein said electric current control means (23, 24) is of the type wherein torsional force exerted on said steering wheel effects electrical signals translatable in terms of direction of rotation and torque force magnitude to energize said solenoid means in accordance, to achieve steering in a selective direction and at a desired rate.

12. In a power steering system as set forth in claim 10, said electric current control means including regulating means (24) responsive to electrical signals effected proportionally to the torsional force exerted on said steering wheel for current control to said solenoid means and further including speed responsive means (26) connected to said regulating means, whereby said regulating means functions in dependence on vehicle speed.

13. In a power steering system as set forth in claim 2, a piston rod extending from said servomotor; and means for effecting said steering stress comprising a drive connection (3-4) from said steering wheel (1) to said piston rod.

14. In a power steering system as set forth in claim 13, said drive connection comprising a steering spindle (2), having a torsion rod (23) as a portion thereof.

15. In a power steering system as set forth in claim 1, including solenoid means disposed on opposite sides of said piston means and said piston means being magnetically biased, whereby energization of said solenoid means effects simultaneous force of attraction and repulsion on said piston means; said piston means being disc-like in shape, wherein the diameter of the piston means is larger than the traverse thereof.

16. In a power steering system as set forth in claim 15, wherein said piston means comprises a disc having a hub (15) extending axially on each side; said housing having respective axial chamber members (17) to slidably support said hubs; respective springs intermediate said hubs and chamber members centering said disc.

17. In a power steering system as set forth in claim 16, said hubs comprising sockets for holding respective springs in conjunction with a respective axial chamber member for centering said disc.

18. A power steering system comprising a pump having a piston of magnetic material and a cylinder in which said piston is reciprocal, a pump pressure chamber on each side of said pump piston in said cylinder and an electrically energizable solenoid means to actuate said pump piston in a selected direction to pump fluid from either said chamber;

a servomotor having a piston and having pressure chambers connected to respective pump chambers; said pump chambers being of larger radial area and shorter axial length relative to said servomotor pressure chambers to minimize the flux path from said solenoid means to said pump piston in effecting pump discharge sufficient to achieve a working stroke for said servomotor piston.

* * * * *